(12) United States Patent
Lisch et al.

(10) Patent No.: US 6,709,624 B2
(45) Date of Patent: Mar. 23, 2004

(54) APPARATUS FOR STABILIZING BOTTLE UPON DEMOLDING

(75) Inventors: G. David Lisch, Jackson, MI (US); Anthony B. Keen, Mansfield, TX (US)

(73) Assignee: Schmalbach-Lubeca AG (DE)

( * ) Notice: Subject to any disclaimer, the term of this patent is extended or adjusted under 35 U.S.C. 154(b) by 269 days.

(21) Appl. No.: 09/909,135

(22) Filed: Jul. 19, 2001

(65) Prior Publication Data

US 2002/0037338 A1 Mar. 28, 2002

Related U.S. Application Data

(60) Provisional application No. 60/220,327, filed on Jul. 24, 2000.

(51) Int. Cl.$^7$ .......................... B29C 49/48; B29C 49/70
(52) U.S. Cl. ..................... 264/537; 425/525; 425/537
(58) Field of Search ................. 425/529, 533, 425/537, 525, 535; 264/532, 537

(56) References Cited

U.S. PATENT DOCUMENTS

| | | | | |
|---|---|---|---|---|
| 2,998,621 A | * | 9/1961 | Adams et al. | 425/530 |
| 3,079,631 A | * | 3/1963 | Gasmire | 264/542 |
| 3,311,684 A | * | 3/1967 | Heider | 264/520 |
| 3,538,543 A | * | 11/1970 | Nataf | 425/535 |
| 3,854,855 A | * | 12/1974 | Pollock et al. | 425/142 |
| 4,066,727 A | * | 1/1978 | Reilly et al. | 264/532 |
| 4,299,371 A | * | 11/1981 | Duga | 249/68 |
| 4,310,282 A | * | 1/1982 | Spurr et al. | 425/533 |
| 4,382,760 A | * | 5/1983 | Wiatt et al. | 425/139 |
| 4,552,527 A | * | 11/1985 | Hunter | 425/535 |
| 6,213,756 B1 | * | 4/2001 | Czesak et al. | 425/525 |
| RE37,243 E | * | 6/2001 | Molinaro et al. | 215/256 |

* cited by examiner

Primary Examiner—Robert B. Davis
(74) Attorney, Agent, or Firm—Harness, Dickey & Pierce, P.L.C.

(57) ABSTRACT

A method and apparatus for stabilizing a blow molded plastic preform and container in a blow mold during a demolding operation. The blow mold has a first mold section, a second mold section, and a mandrel. The mandrel cooperates with a pair of spring loaded jaws slidingly coupled to one or both of the mold sections. With the mold sections in their fully open position, the mandrel with an attached preform and/or container travels into the blow mold. During the final stage of closing the mold sections, the jaws contact the finish and restrain the container. As the mold sections begin to open, the jaws prevent any movement of the container relative to the mandrel.

19 Claims, 5 Drawing Sheets

APPARATUS FOR STABILIZING BOTTLE UPON DEMOLDING

This application claims benefit of provisional appln 60/220,327 filed Jul. 29, 2000.

TECHNICAL FIELD OF THE INVENTION

This invention generally relates to blow molding methods and machines for producing heat set plastic containers. More specifically, this invention relates to a mechanism which stabilizes a blow molded plastic container in the blow mold cavity.

BACKGROUND OF THE INVENTION

Stretch blow molding processes are performed in automatic machines which sequence preforms and containers through several stations to complete the bottle fabrication process. The blow molding operation is performed with a plastic preform which is inflated with a gas to form a container. If the container becomes unstable or hung up in the mold during demolding, the machine must be shut down and the operator must remove the obstructing container from the machine. This results in costly lost production time and an increase in the overall machine cycle time for each container. This is economically undesirable. The trend is to reduce the cycle time of each operation in the cycle. By increasing the speed of the operation, there is a greater possibility of losing control of a container during extraction from the mold because of the high acceleration rates of the various machine components.

When the container is in the finish portion down orientation, there is a tendency for some types of containers to hang up or jam in the stretch blow molding station because of a loss of control of the container during the demolding process.

Containers with a complex sidewall geometry or a high aspect ratio are particularly prone to adhering to one side of the mold as the mold is opened. The result is that the container can cock relative to the mandrel while the container is being removed from the mold. The mandrel is part of the core assembly which passes through the finish portion and into the container. When a container cocks on the mandrel, it can jam in the mold due to the loss of control of the orientation of the bottle. Another aspect of the problem relates to containers with dimensional variations in the inside diameter of the finish portion. If the inside diameter of the finish portion is too large, the container can fall off the mandrel as a result of being jostled by the mold opening which can result in the container being jammed in the mold.

On many rotary type blow molding machines, a mechanism integral with the machine grips and stabilizes the container during demolding, preventing the problems described above. On linear type machines, a bottle stabilizer is not integral with the molding machine. Thus, there is a need for a container stabilizing device applicable to linear molding machines, with preforms in a threads or finish portion down orientation, which prevents the mold opening action from destabilizing the container relative to the mandrel thus preventing the container from getting hung up or jamming in the mold.

SUMMARY OF THE INVENTION

The present invention provides a blow molding device which is adapted for stabilizing a container formed from a preform. The container and preform each have a portion defining a finish. The device includes a mold having a first mold section, a second mold section and a cavity therebetween. The first mold section is movable toward and away from the second mold section. A mandrel is adjacent to the mold. The mandrel has one of the preform and the container disposed thereon. The first mold section and the second mold section is adapted to open and close about the mandrel in order to permit the mandrel to move into and out of the cavity in the mold. At least one jaw is adjacent to one of the first mold section and the second mold section. The at least one jaw conforms to the finish and moves transversely of the finish. The at least one jaw is biased by a resilient member to compress the finish of the preform and the bottle to the mandrel to stabilize the container when the first mold section and the second mold section move away from one another.

No complex controls or actuators are required for the operation of the present invention. When the mold is fully opened, the at least one jaw disengages from the finish of the container and allows for the passage of the incoming mandrel and clamping device, the preform, the outgoing mandrel and clamping device, and finally the molded container. As the mold closes, each jaw comes into contact with the preform finish. Upon further closing of the mold, the jaws travel on guides to compress springs and grip the preform finish. After mold closure and the blow molding process, the spring loaded jaws continue to grip the container finish and retain the container's position relative to the mandrel as the mold initially opens. As the mold further opens, the jaws continue to contact the container finish by the bias of the springs until the jaws reach the end of their travel on the guide rods, and move with each of the mold sections during the remainder of the mold opening travel. Thus, the operation of the present invention is mechanically sequenced with the normal mold opening and closing procedure.

Further features and advantages of the invention will become apparent from the following discussion and accompanying drawings.

DETAILED DESCRIPTION OF THE PREFERRED EMBODIMENT

Figure 1:
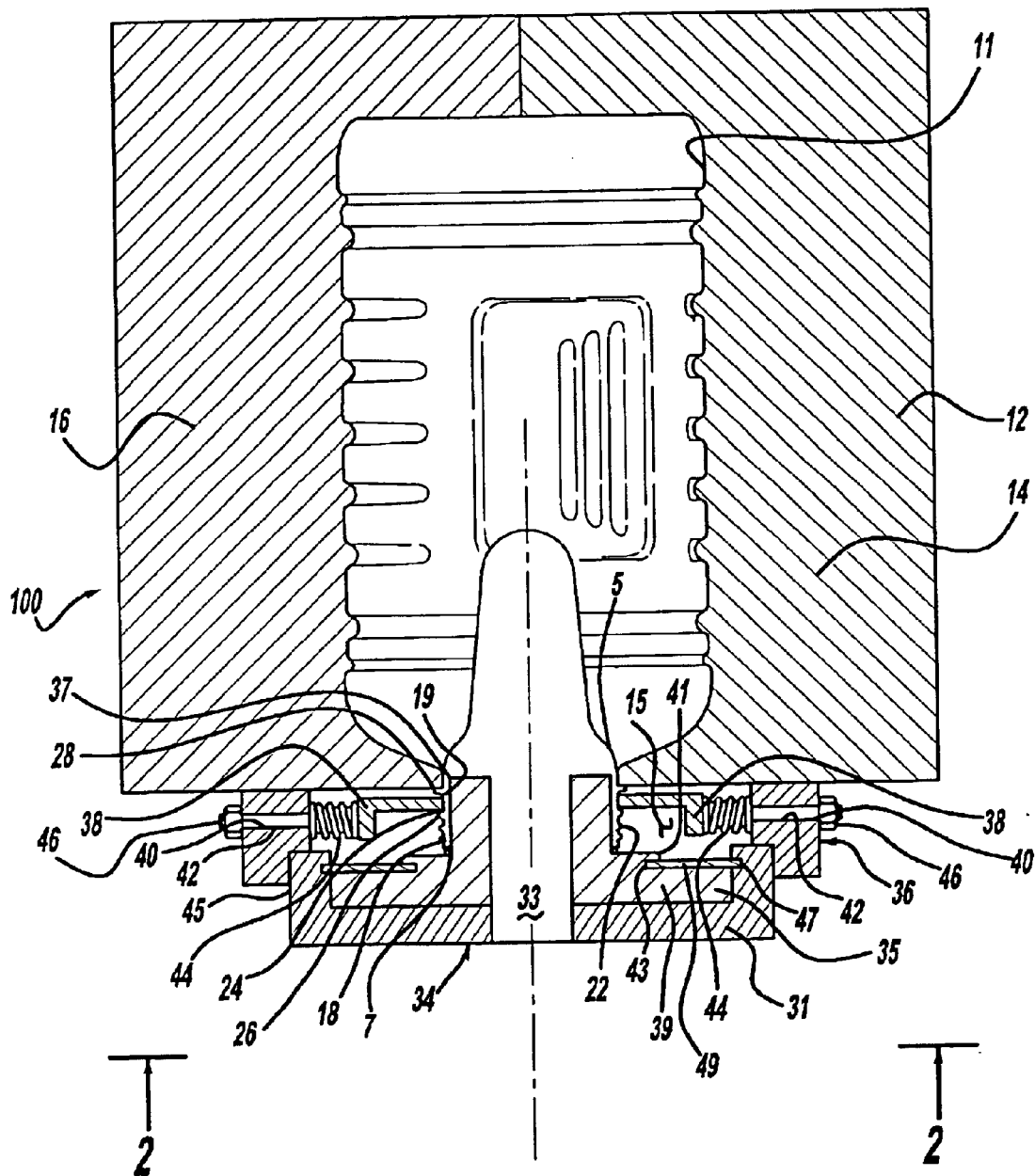
FIG. 1 is a sectional side view of a preform in a mold cavity used to form a blow molded container in accordance with the present invention.

The container stabilizer device according to the invention is shown in FIGS. 1 through 4 and is designated by the numeral 100. The container stabilizer device 100 includes a blow mold 12, a mandrel 34 and an integral clamping device 36. The container stabilizer device 100 is adapted to work in conjunction with a plastic preform 5 and a container 10.

Figure 1A:
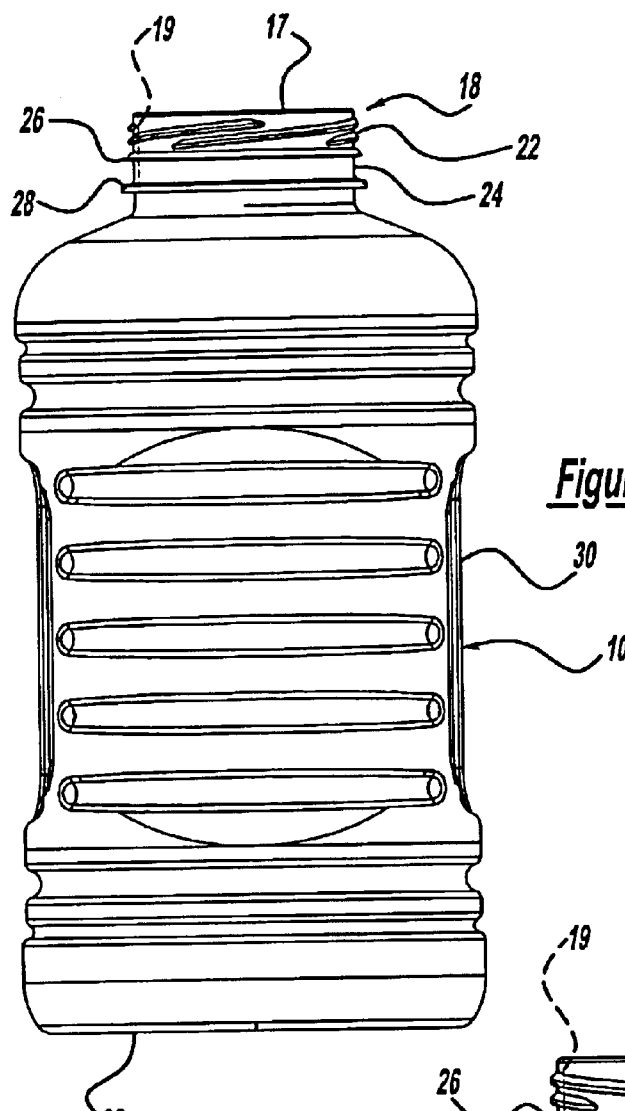
FIG. 1a is a side view of a blow molded container formed in the mold cavity shown in FIG. 1.
Figure 1B:
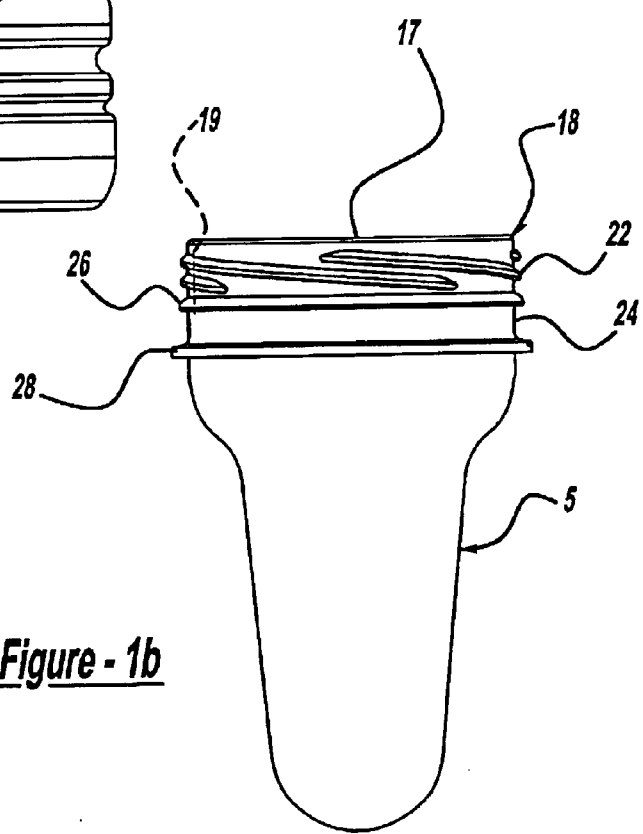
FIG. 1b is a side view of the preform shown in FIG. 1.

As illustrated in FIGS. 1 and 1b, the preform 5 having a finish 18 and threads 22 is provided. The preform 5 is inflated with gas or fluid to form the container 10 as shown in FIG. 1a.

In FIG. 1, the preform 5 is oriented in a mold cavity 11 of the blow mold 12 in a threads down orientation. A thread down orientation is defined as a condition wherein the preform 5 is positioned in the mold cavity 11 of the blow mold 12 with the threads 22 below the plastic body of the preform 5. In FIG. 1b, the preform 5 is shown in a threads up orientation.

With continued reference to FIGS. 1, 1a and 1b, the blow mold 12 includes a first mold section 14, a second mold section 16 and the mold cavity 11 therebetween. The container 10, is processed from the preform 5 which includes a finish 18 having a bore 17 and threads 22 adapted to receive a screw on cap (not shown). A flat region known as an A band 24 is located on the finish 18. The A band 24 is located on the finish 18 between a tamper ring 26 and a support ring 28. Other container 10 features include a sidewall 30 and a base 32 to enclose the bottom of the container 10. The mandrel 34 is adapted to pass through an inner diameter 19 of the finish 18 of the container 10.

The mandrel 34 includes a top portion 31 and an inner projecting portion 35. The mandrel 34 has a passage 33 extending through both the top portion 31 and the inner projecting portion 35. The inner projecting portion 35 has an outer diameter 37 which is less than the inner diameter 19 of the finish 18. Thus, the inner projection portion 35 of the mandrel 34 is capable of being disposed within the finish 18 of the preform 5. The passage 33 provides a flow path for the introduction of gas or fluid into the bore 17 of the preform 5 as is conventional. The mandrel 34 is axially related to the top of the blow mold 12.

The inner projecting portion 35 of the mandrel 34 has a top flange 39, a smaller flange 41 adjacent to the top flange 39 and an undercut 43 between the top flange 39 and the smaller flange 41. The top flange 39 of the inner projecting portion 35 has ball detents on its outer periphery to assist in its retention in a cavity extending through the top portion 31 of the mandrel 34.

The top portion 31 of the mandrel 34 also has an outer peripheral portion 45 and an undercut 47 on its inner diameter. The inner projecting portion 35 of the mandrel 34 is connected to the top portion 31 of the mandrel 34 by means of a conventional retainer such as a snap ring 49 which fits into the undercut 47 of the top portion 31 and the undercut 43 of the inner projecting portion 35 to lock the two portions together, as is conventional.

The outer diameter 37 of the inner projecting portion 35 is smaller than the inner diameter 19 of the finish 18 of the preform 5 so as to accommodate for dimensional fluctuations in the inner diameter 19. An annular seal member 7 is disposed in a counterbore in the mandrel 34. The seal member 7 abuts the end of the finish 18. Alternatively, the seal member 7 is disposed about the outer periphery of the finish 18. The seal member 7 prevents the blow molding fluid from leaking out of the bore 17 of the plastic preform 5 when the container 10 is being formed. The mandrel 34 extends into the inner diameter 19 of the finish 18 and between a pair of jaws 38, and is fastened thereto by conventional means.

Figure 2:
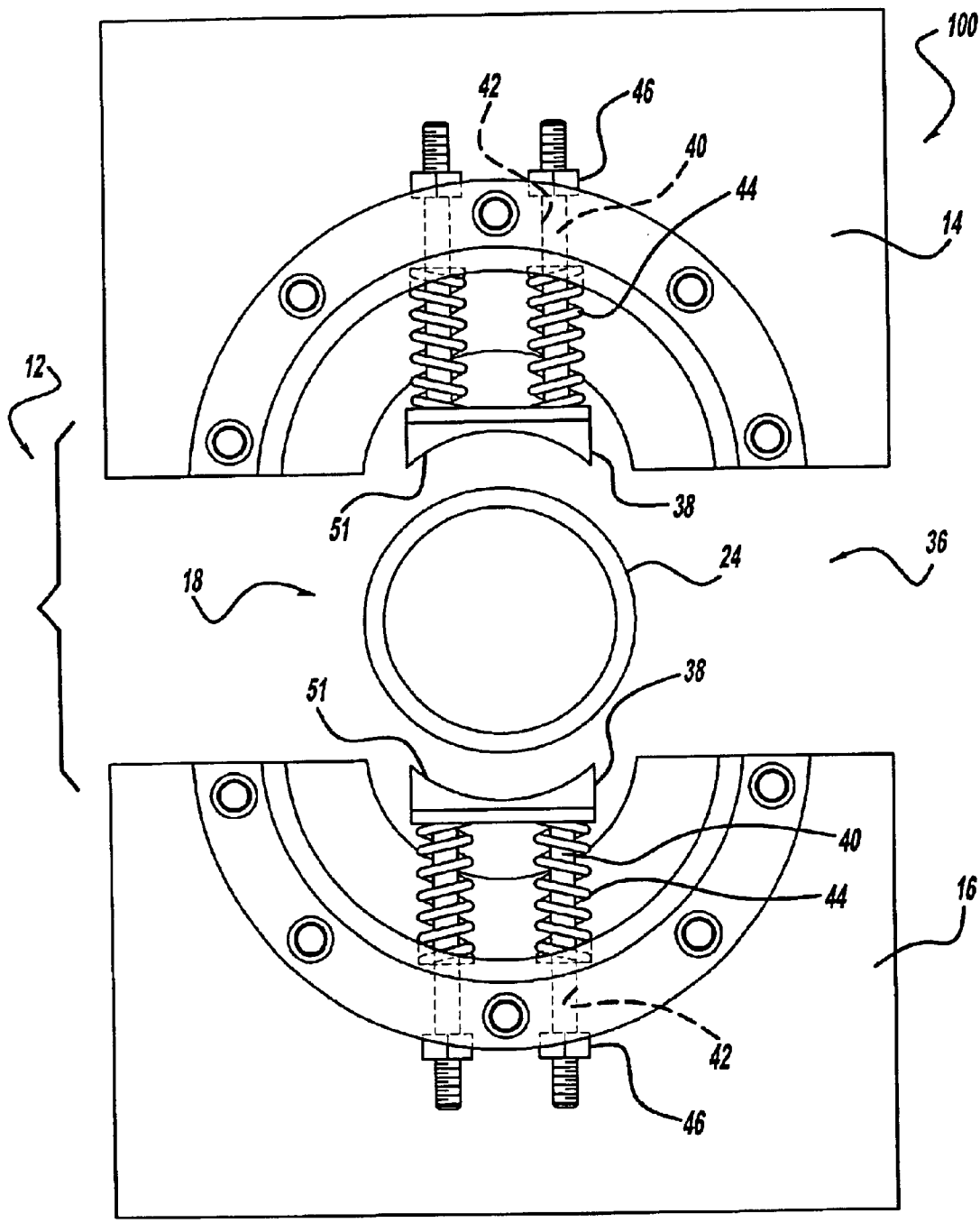
FIG. 2 is a simplified plan view in the direction of arrows 2—2 labeled in FIG. 1 showing the container finish and the container stabilizer device of the present invention with the mold sections in a fully open position.
Figure 3:
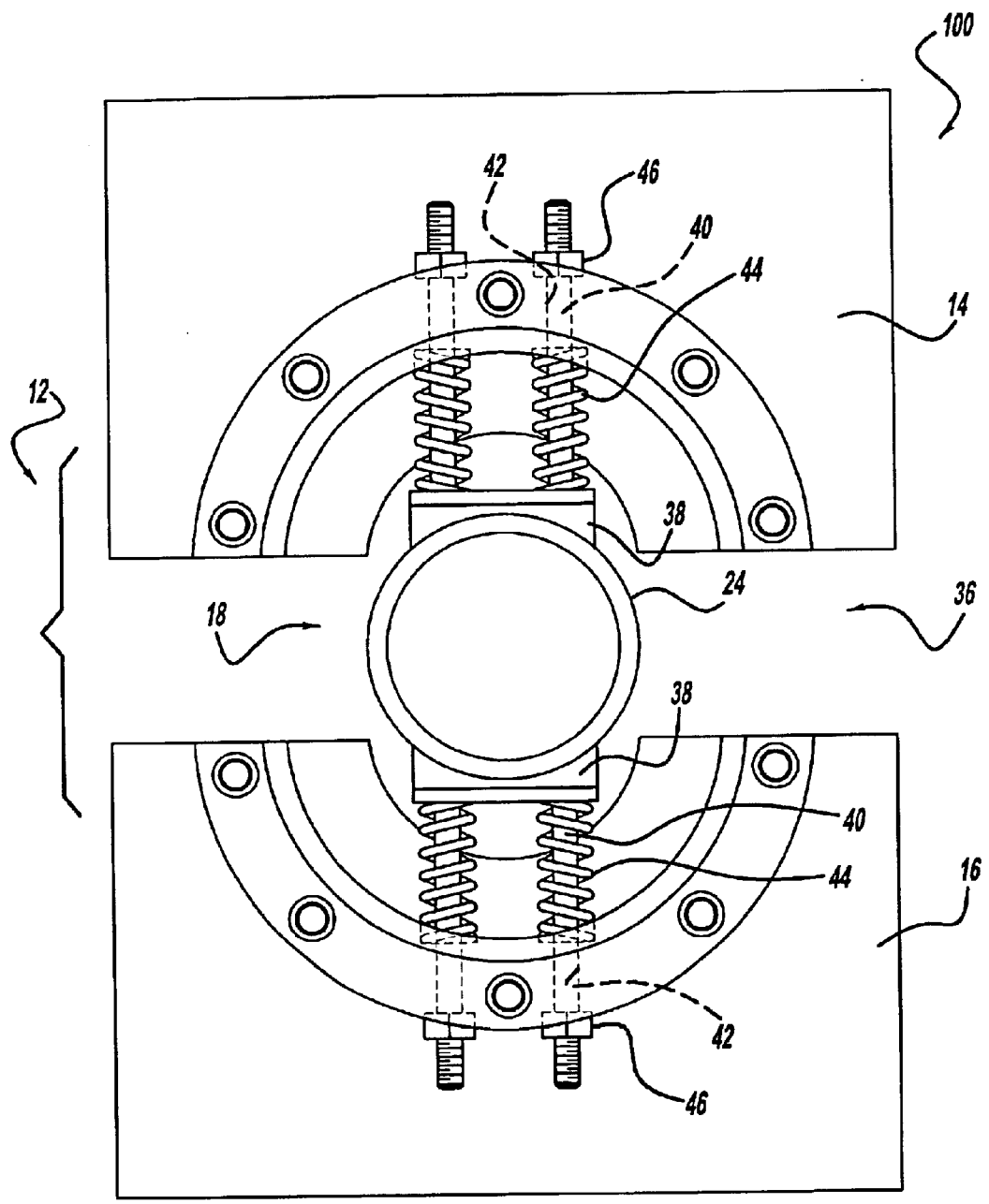
FIG. 3 is the same view as FIG. 2 with the mold sections in a partially closed position.
Figure 4:
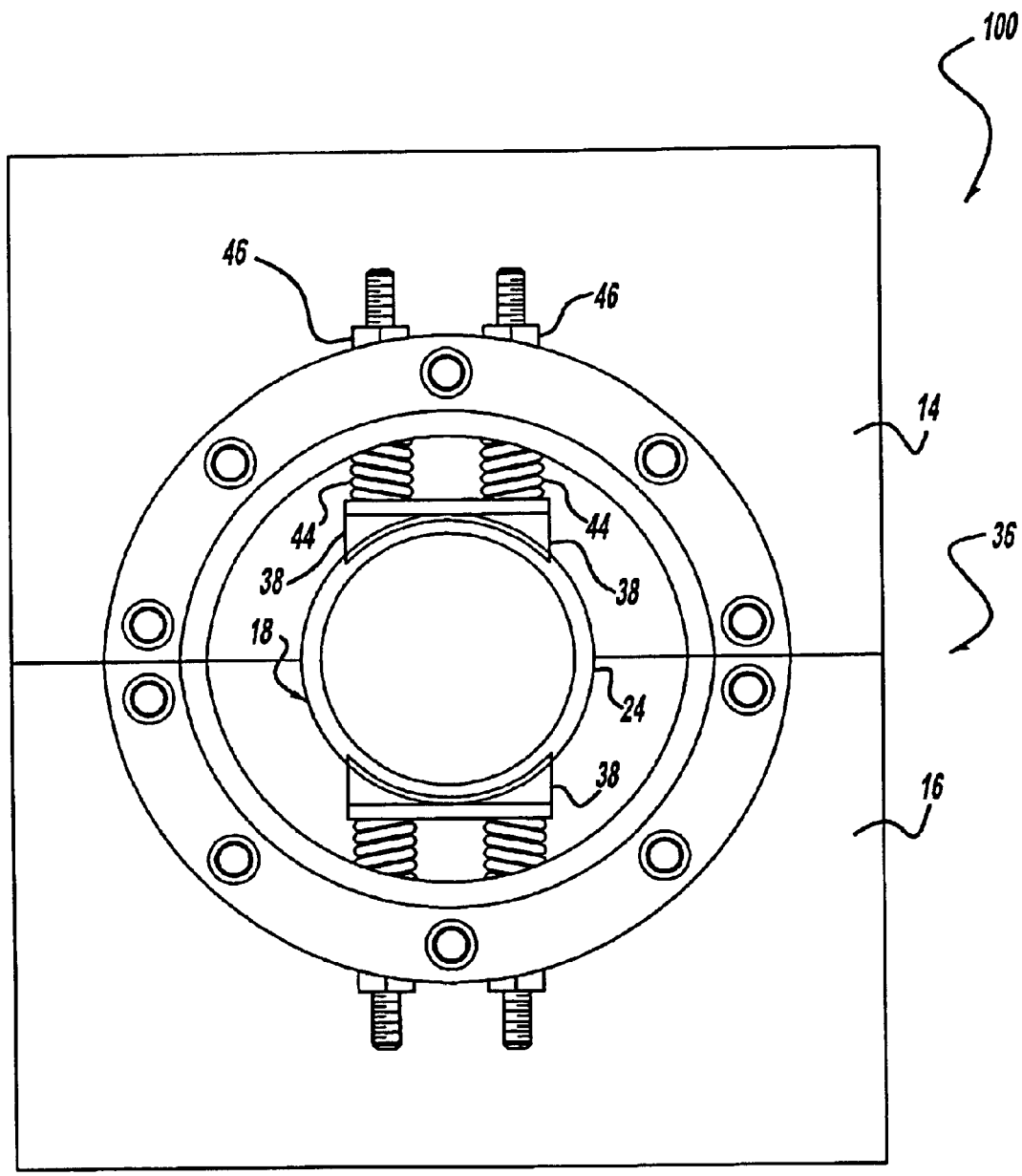
FIG. 4 is the same view as FIG. 2 with the mold sections in a fully closed position.

FIGS. 2 through 4 show the integral clamping device 36, the finish 18 of the container 10 and the container stabilizer device 100 with the mold sections 14 and 16 of the present invention. Mandrel 34 has been removed for clarity. The integral clamping device 36 is disposed in a cavity 15 formed on top of and between the mold sections 14 and 16, and is fastened, in any commonly known manner, on each mold section 14 and 16, respectively. The clamping device 36 has a pair of jaws 38. Each jaw 38 is mounted on a pair of spaced apart guide bars 40. Each jaw 38 is preferably semicircular in shape having a contact surface 51 in the plan view which conform to the curved surface of the A band 24 of the preform 5 and the container 10. The guide bars 40 pass through and glide in bores 42 in the mold sections 14 and 16, respectively. Each guide bar 40 captures and preloads a biasing member 44 between the jaw 38 and the mold 12. Each guide bar 40 is threaded on an end opposite the jaw 38. Nuts 46 are used to attach and compress biasing members 44. Each bore 42 is counterbored to provide appropriate seats for the biasing members 44, nuts 46 and any appropriate washers or shims, as is conventional. The free position of each of the jaws 38 and the preload of the biasing members 44 can be adjusted by rotating each nut 46 and appropriate washers and shims as is well known in the art. The biasing members 44 may be helical springs, or any other resilient member that is within the teachings and scope of the present invention.

In the initial open position of the blow mold 12, as shown in FIG. 2, a clearance is provided between the mold sections 14 and 16, respectively, to permit the mandrel 34 with an attached preform 5 to be positioned between the mold sections 14 and 16. The mold 12 is then moved to a partially closed position, as shown in FIG. 3, at which point each of the jaws 38 contact the A band 24 of the preform 5. As the mold 12 proceeds to a fully closed position, as shown in FIG. 4, each of the opposed jaws 38 continue to contact and press against the A band 24. The biasing members 44 are compressed as each of the jaws 38 translate into the cavity 15 as the mold sections 14 and 16 are closed. When the mold sections 14 and 16 are in the closed position, the biasing members 44 are fully compressed, and each jaw 38 grips and applies pressure to the finish 18 of the preform 5.

Once the mold 12 is fully closed, the preform 5 is stretch blow molded as is conventional to form the container 10. Once the container 10 is formed, the mold 12 is partially opened. During this time, the opposing pair of jaws 38 continue to apply pressure to each side of the A band 24 and, in turn, the mandrel 34 because of the compressed biasing members 44. The pressure of the jaws 38 captures the container 10 around the circumference of the A band 24 in the horizontal direction, and between the tamper ring 26 and the support ring 28 in the vertical direction. This stabilizes the container 10 and prevents any movement of the container 10 relative to the mandrel 34 as the mold 12 is initially opened.

As the mold sections 14 and 16 continue to open, the jaws 38 continue to apply pressure against the A band 24, thus maintaining the container 10 in the desired stabilized position until the mold sections 14 and 16 are approximately half open (see FIG. 3). At this point, the jaws 38 begin to disengage from the A band 24 since the travel of each jaw 38 is limited by the length of the guide bars 40. Thereafter, each jaw 38 moves with each respective mold section 14 and 16 to the position shown in FIG. 2. This position allows the mandrel 34 to be retracted out of the mold 12 and permits the removal of the completed container 10 from the mold 12. Thereafter, another cycle of the molding process can be repeated.

The foregoing discussion discloses and describes a preferred embodiment of the present invention. One skilled in the art will readily recognize from such discussion, and from the accompanying drawings and claims, that changes and modifications can be made to the invention without departing from the true spirit and fair scope of the invention as defined in the drawings and in the following claims.

I claim:

1. A blow molding device adapted for stabilizing a container formed from a preform, the preform and the container each having a portion defining a finish, said device comprising:

a mold including a first mold section, a second mold section and a cavity therebetween;

a mandrel adjacent to said mold, said mandrel having one of the preforms and the container disposed thereon, said first mold section and said second mold section being adapted to open and close about said mandrel in order to permit said mandrel to translate into and out of said cavity in said mold; and at least one jaw member adjacent to one of said first mold section and of said second mold section, said jaw member conforming to the finish and moving transversely of the finish, said jaw member being biased by a resilient member to compress the finish between said jaw member and said mandrel to stabilize the container when said first mold section and said second mold section separate, said jaw member being retracted away from said finish when said first and second mold sections traverse to a fully open condition to allow translation of said mandrel with one of the preform and the container attached thereto.

2. A blow molding device adapted for stabilizing a container formed from a preform, the preform and the container each having a portion defining a finish, said device comprising:

a mold including a first mold section, a second mold section and a cavity therebetween;

a mandrel adjacent to said mold, said mandrel having one of the preforms and the container disposed thereon, said first mold section and said second mold section being adapted to open and close about said mandrel in order to permit said mandrel to translate into and out of said cavity in said mold; and at least one jaw member adjacent to one of said first mold section and of said second mold section, said jaw member conforming to the finish and moving transversely of the finish, said jaw member being biased by a resilient member to compress the finish between said jaw member and said mandrel to stabilize the container when said first mold section and said second mold section separate, said resilient member being disposed around a guide bar.

3. A blow molding device adapted for stabilizing a container formed from a preform, the preform and the container each having a portion defining a finish, said device comprising:

a mold including a first mold section, a second mold section and a cavity therebetween;

a mandrel adjacent to said mold, said mandrel having one of the preforms and the container disposed thereon, said first mold section and said second mold section being adapted to open and close about said mandrel in order to permit said mandrel to translate into and out of said cavity in said mold; and at least one jaw member adjacent to one of said first mold section and of said second mold section, said jaw member conforming to the finish and moving transversely of the finish, said jaw member being biased by a resilient member to compress the finish between said jaw member and said mandrel to stabilize the container when said first mold section and said second mold section separate, said jaw member being slidingly attached to one of said first mold section and said second mold section by a guide bar.

4. The blow molding device of claim 1 wherein said resilient member is a spring member.

5. The blow molding device of claim 1 wherein said jaw member is a pair of opposing jaws.

6. The blow molding device of claim 1 wherein said at least one biasing member is compressed by said jaw member coming into contact with the finish of the preform when said first and said second mold sections are translated toward each other.

7. The blow molding device of claim 3 wherein said resilient member is disposed between said jaw member and one of said first mold section and said second mold section.

8. The blow molding device of claim 3 wherein said resilient member is disposed on a guide bar, said resilient member being compressed after said jaw member contacts the finish and the first mold section translates toward said second mold section.

9. The blow molding device of claim 8 wherein said resilient member is a helical spring.

10. A method of stabilizing a container in a blow mold, the container being formed from a plastic preform including a finish, the blow mold including a first mold section, a second mold section, and a cavity therebetween, and a core assembly, the core assembly having a mandrel, the mandrel extending into one of the preform and the container, said method comprising:

attaching a jaw member to one of the first mold section and the second mold section, said jaw member having a section conforming to the finish of the preform;

moving the mandrel with the preform unto the cavity when the first mold section and the second mold section are in an open position;

moving the first mold section and the second mold section to an initial closed position whereby said jaw member moves transversely toward the finish;

translating the first mold section and the second mold section to a final closed position whereby said jaw member contacts the finish;

moving said jaw member transversely into a recess in one of said first mold section and said second mold section, said jaw member being biased toward the finish by a biasing member, said biasing member being compressed when said jaw member moves transversely into said recess;

opening said blow mold after forming the container, said jaw member biasing the finish between said jaw member and the mandrel to restrain the container in the cavity during an initial opening position of the mold; and removing the container on the mandrel from the cavity after said jaw member is translated away from the finish and the mold is in an open position.

11. The method of claim 10 wherein the finish of the container has an A band.

12. The method of claim 10 wherein said jaw member is slidingly coupled to one of said first mold section and said second mold section by a guide bar.

13. The method of claim 10 wherein said biasing member is a spring.

14. The method of claim 10 wherein said jaw member has a guide bar, said biasing member being disposed on said guide bar between said jaw member and one of said first mold section and said second mold section.

15. The method of claim 10 wherein said jaw member has a helical spring member and a guide bar, said helical spring member being disposed around said guide bar.

16. The method of claim 10 wherein said jaw member has a pair of guide bars and a pair of helical springs, each of said helical springs being disposed on each of said pair of guide bars.

17. The method of claim 10 wherein said jaw member has a portion conforming to the an outer perimeter of the finish.

18. The method of claim 10 wherein said jaw member is a pair of opposing jaw members.

19. The method of claim 10 wherein the mandrel has a projection, said projection having an outer diameter, said outer diameter being smaller than an inner diameter of the finish.

* * * * *

UNITED STATES PATENT AND TRADEMARK OFFICE
CERTIFICATE OF CORRECTION

PATENT NO. : 6,709,624 B2
DATED : March 23, 2004
INVENTOR(S) : G. David Lisch and Anthony B. Keen It is certified that error appears in the above-identified patent and that said Letters Patent is hereby corrected as shown below:

Column 1,
Line 5, "July 29, 2000" should be -- July 24, 2000 --.

Column 6,
Line 56, "unto" should be -- into --.

Column 8,
Line 13, after "conforming to" delete "the".

Signed and Sealed this

Seventeenth Day of May, 2005

JON W. DUDAS
*Director of the United States Patent and Trademark Office*